INVENTOR.
HARRIS D. LE VINE
HUGO J. DI GIOVANNI

Dec. 2, 1952  H. D. LE VINE ET AL  2,620,446
RADIATION DETECTION AND MEASURING MEANS
Filed Sept. 11, 1950  3 Sheets-Sheet 2

INVENTOR.
HARRIS D. LE VINE
HUGO J. DI GIOVANNI
BY
Roland A. Anderson
Attorney

Dec. 2, 1952     H. D. LE VINE ET AL     2,620,446
RADIATION DETECTION AND MEASURING MEANS
Filed Sept. 11, 1950     3 Sheets-Sheet 3
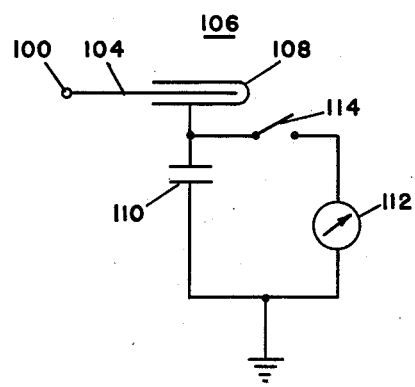
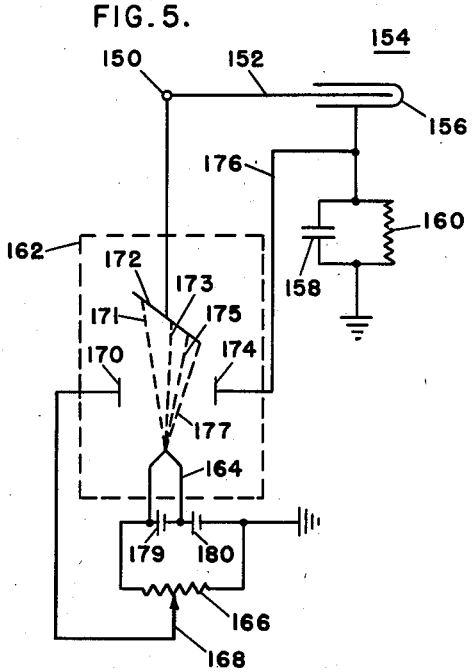
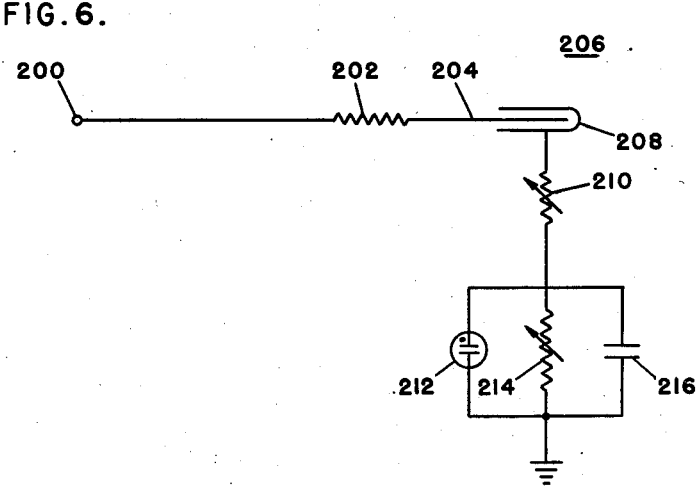
*INVENTOR.*
HARRIS D. LE VINE
HUGO J. DI GIOVANNI
BY
Roland A. Anderson
Attorney Patented Dec. 2, 1952

2,620,446

UNITED STATES PATENT OFFICE 2,620,446

RADIATION DETECTION AND MEASURING MEANS

Harris D. Le Vine, Arlington, N. J., and Hugo J. Di Giovanni, New York, N. Y., assignors to the United States of America as represented by the United States Atomic Energy Commission Application September 11, 1950, Serial No. 184,288

1 Claim. (Cl. 250—83.6)

The present invention relates to a new and improved method and apparatus for measuring a wide range of radioactivity intensity levels.

Radiation detection instruments, employing Geiger-Muller tubes, that are presently being used as survey or monitoring instruments have a common characteristic which makes them inadequate at extremely high radiation levels such as may exist after the explosion of an atomic weapon. This characteristic is the response of the instrument which begins to decrease rather than increase after a certain level of radioactivity is reached. The conventional instrument therefore becomes ineffective at these levels as its indication could mean that either a high or a low level of radioactivity is present. This will be further demonstrated hereinafter with reference to Figure 3.

The apparatus of the present invention is adapted for the direct measurement of the direct current component of the radiation counter tube discharge. Therefore, the response of this apparatus will continuously increase with increase in the level of radioactivity.

It is accordingly an object of the present invention to provide a simple and improved apparatus for detecting a wide range of radioactivity intensity levels.

Another object of the invention is to provide a method for detecting different intensity levels of radioactivity.

A third object is to provide an improved portable radiation detection instrument whose response continuously increases with the level of radioactivity up to several hundred roentgens per hour and more.

Still another object of the present invention is to provide an improved portable radiation detection instrument which may be constructed of simple readily obtainable component parts.

It is also an object of the present invention to provide a radiation detection circuit which requires no amplifying equipment.

Another object of the present invention is to provide a radiation detection circuit which measures the direct current component of the Geiger tube discharge current.

More particularly, a preferred embodiment of the present invention includes a conventional radiation counter tube such as a Geiger-Muller tube in conjunction with a high voltage power supply. Means for measuring the direct current or D. C. component of the Geiger-Muller tube discharge current are placed in series with an electrode of the Geiger-Muller tube. The resulting assembly is calibrated to measure the ionization present in the Geiger-Muller tube.

The many objects and advantages of the present invention may best be appreciated by reference to the accompanying drawings, the figures of which illustrate apparatus incorporating preferred embodiments of the present invention and capable of carrying out the methods of the invention.

Figures 4, 5 and 6 are schematic views of different embodiments of the ratemeter circuit of the present invention.

Figure 1:
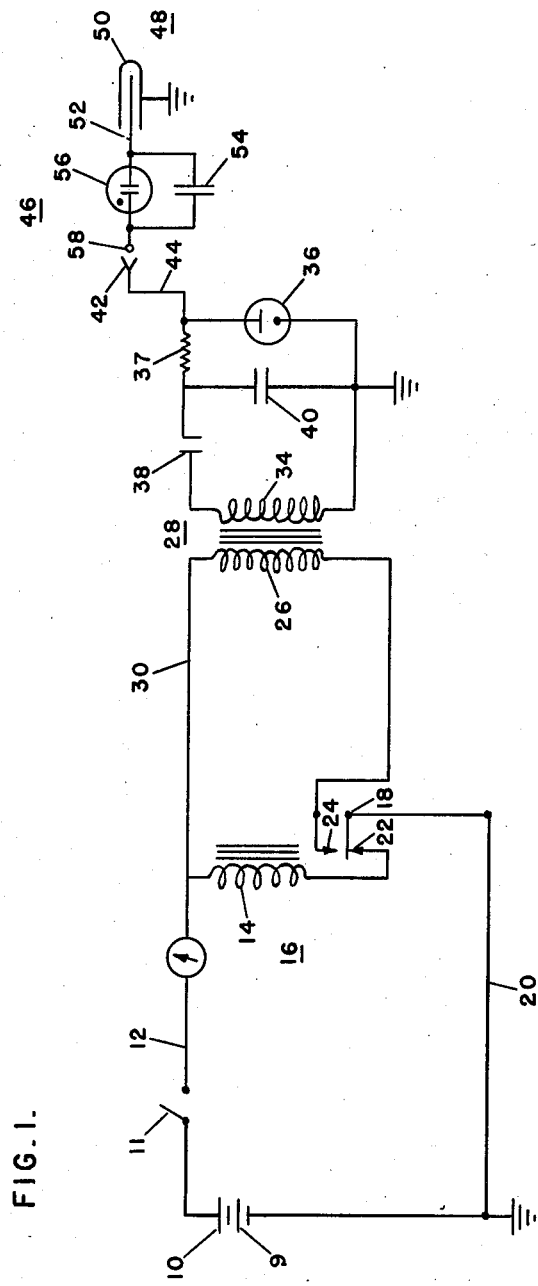
Figure 1 is a schematic view of a portable high voltage power supply shown in operable relationship with one embodiment of the ratemeter circuit of the present invention.

Referring to Figure 1, one embodiment of a power supply is shown diagrammatically in operable relationship with a ratemeter circuit of the present invention. Voltage for the power supply is initially supplied from batteries 9 and 10. This voltage is applied through switch 11 on conductor 12 to one side of coil 14 of a D. C. relay 16. Armature 18 of relay 16 is connected to ground through conductor 20. Connected to armature 18 is normally closed relay contact 22. Contact 22 in turn is connected to the other side of coil 14 of relay 16. Contact 24 of relay 16 is normally open and is connected to one side of the primary winding 26 of a step-up transformer 28. The other side of primary winding 26 is connected to one end of coil 14 by conductor 30.

Connected to the secondary 34 of transformer 28 is a rectifier 38 and the combination comprising regulator tube 36, resistor 37 and condenser 40. One side of each of winding 34, condenser 40 and regulator tube 36 is connected to ground and resistor 37 is connected between the ungrounded terminals of condenser 40 and regulator tube 36. The junction point between resistor 37 and tube 36 is connected to a terminal 42 by means of conductor 44. Terminal 42 is provided so that various embodiments of the detection and measuring device of the present invention may be connected thereto. One such device 46 is shown in close relationship to terminal 42.

Detection device 46 consists of a Geiger-Muller tube 48 which has a grounded cathode 50 and an anode 52. In series with anode 52 is one embodiment of the ratemeter circuit of the present invention which includes an indicator assembly comprising a condenser 54 and a neon glow tube 56 connected in parallel. The other end of the assembly is connected to a terminal 58.

By connecting terminals 42 and 58 the instrument is ready for radiation detection. When the power supply switch 11 is closed the voltage of batteries 9 and 10 is impressed across coil 14 of relay 16. This energizes the relay causing armature 18 to be attracted to the normally open contact 24 and to make electrical contact therewith. When armature 18 breaks contact with relay contact 22 the ground is removed from the relay coil, thereby deenergizing the relay. This deenergization causes armature 18 to return to its normal position, again grounding coil 14 and causing the armature to be attracted towards the normally open contact 24.

This "make and break" of the relay occurs several times a second. As one end of primary winding 26 of transformer 28 is connected to contact 24, this winding is energized in a manner similar to the coil of relay 16 every time armature 18 makes contact with relay contact 24. Each time the flow of current through the primary winding is broken a high "inductive kick back" voltage occurs across the secondary winding 34. This high inductive voltage is rectified in rectifier 38 and the energy is stored in capacitor 40. The rectified voltage may vary considerably with change in battery voltage and circuit conditions. Therefore, to stabilize the voltage supply, a corona regulator tube 36 is used across condenser 40 so that a fixed voltage is always impressed upon the counter tube circuit connected to terminal 42. Resistor 37 is used so that regulator tube 36 will provide the proper operating voltage without drawing excessive current.

The high voltage supplied across tube 36 is applied to the anode 52 of tube 48 by means of conductor 44, terminals 42 and 58 and the indicator assembly of the ratemeter circuit. When an ionization event is created in tube 48 an avalanche of ionization occurs therein, causing a discharge current to flow from anode 52 to cathode 50. If condenser 54 were not connected across glow tube 56 the discharge current would flow through this tube and cause it to flash. Therefore, as each ionizing event occurred in tube 48, a single flash of light would appear in the glow tube 56. However, the charge per pulse would not be great enough to give high illumination of the glow tube and it would be difficult to count the individual pulses at low counting rates. Accordingly, condenser 54 is used to add up the individual pulses and give a high intensity light flash. By this means a single high intensity flash is obtained in place of several low intensity flashes. Therefore, a quantitative evaluation of the radiation level can be secured merely by measuring the time interval between flashes.

Figure 2:
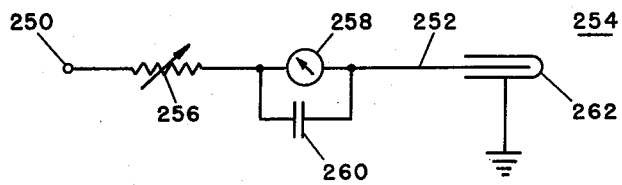
Figure 2 is a schematic view of a second embodiment of the ratemeter circuit of the present invention.

Referring now to Figure 2, a second embodiment of the detection device is shown. In operation, terminal 250 is connected to terminal 42 of the power supply of Figure 1. Terminal 250 is connected to anode 252 of Geiger-Muller tube 254 through variable resistor 256 which is in series with the indicator assembly comprising a microammeter 258 and a condenser 260 connected in parallel. Cathode 262 of tube 254 is connected to ground.

This ratemeter circuit is particularly well adapted for measurements of relatively high radiation levels. When a charged particle or ray causes ionization in the tube 254 an avalanche of ionization occurs in the tube causing a discharge current to flow from anode 252 to cathode 262. The D. C. component of this current can be measured on meter 258 which can be directly calibrated for radiation level measurement. In the intrument, resistor 256 is provided for proper scale calibration of meter 258. Condenser 260 is connected in parallel with meter 258 to improve the damping characteristic of the meter at low counting rates but is not needed for high counting rates.

The calibration of meter 258 covers a very wide range as it has been found by the inventors that an approximately logarithmic variation exists between the D. C. component of the discharge current developed in a Geiger-Muller tube and the radiation intensity causing that discharge current up to a high level of radioactivity. This relationship is illustrated by the linear portion of line 300 in Figure 3 which is a plot on a logarithmic scale of the D. C. component of the ionization current in a Geiger-Muller tube vs. radiation intensity. Also shown in the graph of Figure 3 is line 302 which represents the response, at very high radiation levels, of radiation detection instruments as they are known in the art today.

Figure 3:
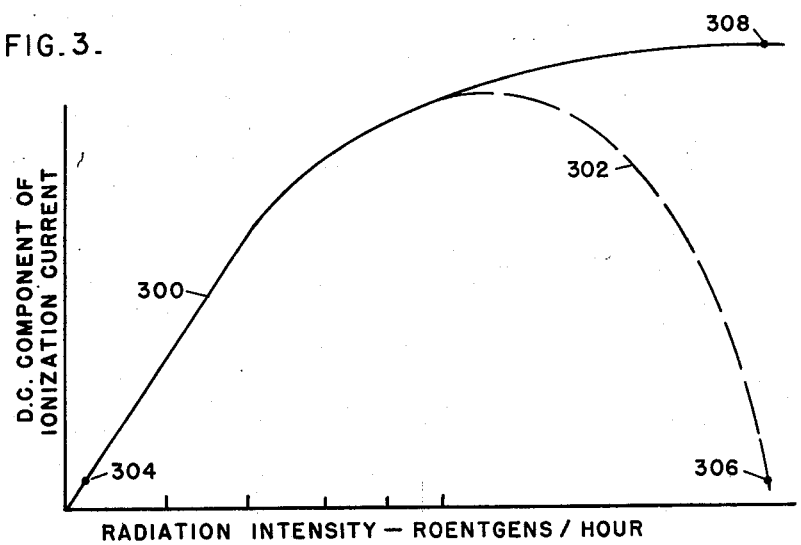
Figure 3 is a graph showing the typical relationship between the D. C. component of the ionization current in the Geiger-Muller tube and the radiation intensity causing the ionization.

It can be seen from Figure 3 that ratemeter circuits of the present invention, whose responses follow line 300, have a decided advantage for use as survey and monitoring instruments over presently known radiation detection instruments. For example, let us assume that point 304 on line 300 represents a radiation level of 0.5 roentgen/hr. and points 306 and 308, on lines 302 and 300 respectively, represent a radiation level of 200 roentgens/hr. It is apparent that the conventional detection instruments will show the same indication for both 0.5 roentgen/hr. and 200 roentgens/hr. This would be disastrous if the instruments were being used to monitor either a radioactive area after an explosion of an atomic weapon or any other area wherein such high levels of radiation are possible. On the other hand, the detection circuits of the present invention will show a much larger indication for the 200 r./hr. level than for the 0.5 r./hr. level. Even if the indicating means of the present invention were not calibrated up to 200 r./hr., it would still show a full scale deflection. This would rule out any possibility of mistaking a dangerously radioactive area for one that is only slightly radioactive.

A third embodiment of the detecting sub-combination of the present invention is shown in Figure 4. This can be used in place of detector 46 of Figure 1. In this case terminal 100 is connected to terminal 42 of the power supply of Figure 1. Terminal 100 is directly connected to the anode 104 of a Geiger-Muller tube 106. Connected between cathode 108 of the tube and ground is an indicator assembly comprising a condenser 110 and a ballistic galvanometer 112 connected in parallel. Connected between the galvanometer and condenser is a switch 114.

As the ionizing events occur in tube 106, the discharge current, which flows between anode 104 and cathode 108, charges condenser 110. This condenser can be made to discharge through galvanometer 112 by closing switch 114. The amount of deflection of the galvanometer is an indication of the radiation level. By making switch 114 a simple mechanical time delay switch, a calibrated time delay may be inserted between successive closings of the switch. The amount of charge accumulated across condenser 110 in this calibrated time interval provides a means for calibrating the scale of galvanometer 112.

For example, if switch 114 is normally closed, no charge will accumulate across the condenser. When the switch is opened, charge will begin to accumulate across condenser 110 in an amount proportional to the discharge current between anode 104 and cathode 108. This discharge current is in turn proportional to the amount of ionization present in tube 106. If switch 114 now closes automatically, say five seconds after it has been opened, the deflection of galvanometer 112 will be the result of the five second accumulation of charge across the condenser. This deflection can be calibrated in terms of milliroentgens or roentgens, depending on the size of the condenser and galvanometer.

Still another embodiment of the detecting sub-combination of the present invention is shown in Figure 5. In this embodiment terminal 150 is connected to terminal 42 of the power supply in Figure 1. Terminal 150 is directly connected to the anode 152 of a Geiger-Muller tube 154. An assembly for governing the indicator means and comprising a condenser 158 and resistor 160 is connected in parallel between cathode 156 and ground. Also connected between anode 152 and cathode 156 is an electron ray tube enclosed by the dotted line 162. The filament 164 of this tube is supplied with current from a battery 179 while a battery 180 is connected in series with battery 179 and ground. A potentiometer 166 is connected across the batteries 179 and 180 in series. Slider 168 of this potentiometer is connected to plate 170 of the electron ray tube 162. The fluorescent target 172 of the ray tube is directly connected to terminal 150. Electron ray tube 162 has another plate 174 which is connected to cathode 156 of tube 154 by conductor 176.

The operation of the circuit will now be explained. With no radiation present in the tube 154 there will be no current flow through resistor 160 of the indicator control assembly. Therefore plate 174 of the electron ray tube will be at ground potential. If slider 168 of potentiometer 166 is placed at ground potential, plate 170 of the electron ray tube will also be at ground potential. Therefore, with no radiation present (no ionizing events occurring in the tube 154) the stream of electrons flowing from filament 164 will be directed towards target 172 within the path outlined by dotted lines 171 and 175 and will illuminate a maximum area on that target.

As ionizing events occur within tube 154 a discharge current will flow between anode 152 and cathode 156. This flow of current will charge condenser 158 an amount directly proportional to the radiation intensity present in tube 154. As condenser 158 is charged it will cause the potential of plate 174 to increase an amount also directly proportional to the radiation intensity. The electron stream flowing from filament 164 to target 172 will now be partially attracted towards plate 174 due to that plate's increase in potential. The electron stream will now illuminate a smaller portion of target 172, for example, that portion between dotted lines 173 and 177. This will cause an increased dark area on fluorescent target 172. By moving slider 168 of potentiometer 166 away from ground the potential of plate 170 can be increased. When the potential of plate 170 is exactly equal to the potential of plate 174 the electron stream from filament 164 will assume its original position on target 172 and the dark area on the target will be reduced to a minimum.

Therefore for use as a detection means the operator need merely vary slider 168 until the minimum dark area of fluorescent target 172 is obtained. The level of radiation intensity can be read directly from a scale calibrated on potentiometer 166. This potentiometer may be made with any taper to provide a calibration for the desired range of radiation intensity.

It is evident that batteries 9 and 10, used in the power supply of Figure 1, may be simultaneously used in place of batteries 179 and 180, respectively.

A fifth embodiment is shown in Figure 6. Terminal 200 is connected to terminal 42 of the power supply in Figure 1. Terminal 200 is connected to anode 204 of Geiger-Muller tube 206 through resistor 202. Between cathode 208 of tube 206 and ground is connected a variable resistance 210 in series with the indicator assembly and including neon tube 212, variable resistor 214 and condenser 216, said tube, resistor and condenser being in parallel.

Charged particles or rays passing through tube 206 will ionize the gas therein and cause a constant D. C. component of the ionization current to flow between anode 204 and cathode 208. The amplitude of the current will depend on the level of radiation which induced the tube discharge. This constant current flows from cathode 208 to ground through the series parallel branch above described. As long as the voltage drop across resistor 214 is less than the ignition potential of neon glow lamp 212, no discharge in this lamp will occur. By increasing the variable resistance 214 the voltage across this resistance can be made to rise until the ignition potential of glow lamp 212 is reached. At this point the glow lamp will discharge. Therefore, by calibrating resistor 214 directly in roentgens the radiation level in tube 206 can be read from the resistor dial at the point of glow lamp ignition.

Condenser 216 produces relaxation oscillations when the voltage drop across resistor 214 is greater than the ignition potential of lamp 212 thereby causing continuous flashing of lamp 212. For use in this detector the glow lamps 212 are all selected for the same ignition potential. However, small differences in this potential can be compensated by use of calibration adjust resistor 210.

In use the operator turns the knob on resistor 214 to its maximum value. This knob is then turned toward the maximum value until the glow lamp flashes. The radiation level is then read directly from the calibration dial.

It is evident that the disclosed embodiments of the detection device of the present invention will work at high efficiency even at low levels of radiation and therefore the same instrument can be used throughout a very wide range of radioactivity. This is best illustrated by the graph of Figure 3 where the logarithmic variation of the D. C. component of the Geiger-Muller tube discharge current is plotted. By making use of this logarithmic variation, a very wide scale calibration can be provided on any one range of the current indicating means of the subject device. This is important when the instrument is being used by civil defense or other emergency groups as there will be no necessity for changing the range of the meter or mistaking the reading of one scale for that of another. For example, depending on the type of counter tube and meter being used an instrument could be constructed using the principle of the present invention which will begin indicating at 50 milliroentgens and will have a full scale reading of 5 roentgens. Correspondingly higher or lower ranges are available depending on the ultimate use of the instrument.

The various embodiments of the detection device are particularly well adapted for use as portable radiation measurement instruments. This becomes apparent when it is realized that the D. C. component of the Geiger-Muller tube discharge current is measured directly with no amplifiers and associated operating circuits being required. Therefore, the number of working parts is kept to a minimum enabling the instrument to be very light in weight. The adaptability of the instrument may be shown by the fact that the entire supply and detector device can operate from two ordinary 1½ volt flash light batteries. It is also possible to use headphones either as the current indicating means or in conjunction with the disclosed indicating means of the various detection devices.

Since many embodiments might be made of the present invention and since many changes might be made in the embodiments described it is to be understood that the foregoing description is to be interpreted as illustrative only and not in a limiting sense.

We claim:

A ratemeter for measuring a wide range of radioactivity intensity levels which comprises a radiation counter tube whose discharge current has a direct current component that varies logarithmically with the radiation intensity, means for supplying operating voltage to the electrodes of said tube, a condenser in parallel combination with a resistor, said combination being connected in series with one electrode of said counter tube, an electron ray tube connected between the anode and cathode of said counter tube, said ray tube including at least a fluorescent target, two plate electrodes and a filament, said fluorescent target being connected to the anode of said counter tube, the first plate of said ray tube being connected to one electrode of said counter tube whereby the direct current component of the discharge current of the counter tube charges said condenser an amount proportional to the ionization level present in the counter tube causing the potential of the first plate of said ray tube to increase by said proportional amount and means for varying the potential of the second plate of said ray tube until it equals the potential of said first plate.

HARRIS D. LE VINE.
HUGO J. DI GIOVANNI.

REFERENCES CITED

The following references are of record in the file of this patent:

UNITED STATES PATENTS

| Number | Name | Date |
|---|---|---|
| 2,401,723 | Deming | June 11, 1946 |
| 2,405,572 | Friedman | Aug. 13, 1946 |
| 2,496,886 | Molloy et al. | Feb. 7, 1950 |
| 2,524,901 | Fahrner | Oct. 10, 1950 |

OTHER REFERENCES

An Integration Radiation Meter, MDDC, 884, 2 pgs. Published by U. S. Atomic Energy Comm., January 17, 1947.